United States Patent [19]

Tomoyuki

[11] Patent Number: 5,145,746

[45] Date of Patent: Sep. 8, 1992

[54] LAMINATING MATERIAL FOR SAFETY GLASS

[75] Inventor: Kotani Tomoyuki, Yokohama, Japan

[73] Assignee: Diafoil Company, Ltd., Tokyo, Japan

[21] Appl. No.: 781,306

[22] Filed: Oct. 25, 1991

[30] Foreign Application Priority Data

Oct. 26, 1990 [JP] Japan ................... 2-289864

[51] Int. Cl.$^5$ ........................... B32B 15/08
[52] U.S. Cl. ................ 428/458; 428/432; 428/434; 428/437
[58] Field of Search ............ 428/458, 426, 432, 434, 428/437

[56] References Cited

U.S. PATENT DOCUMENTS

| | | | |
|---|---|---|---|
| 5,024,895 | 6/1991 | Kavanagh et al. | 428/458 X |
| 5,059,460 | 10/1991 | Heyes et al. | 428/480 X |
| 5,091,258 | 2/1992 | Moran | 428/437 |

FOREIGN PATENT DOCUMENTS

62-140828  6/1987  Japan.
2006126  1/1990  Japan.

*Primary Examiner*—Thomas J. Herbert, Jr.
*Attorney, Agent, or Firm*—David G. Conlin

[57] ABSTRACT

A laminating material for safety glass is disclosed wherein said material comprises a substrate of a polyester film satisfying the following conditions (1) to (4), on one side of which a heat ray shielding layer consisting of a metal and/or a metallic compound:

$$R \geq 8000 \quad (1)$$

$$H \leq 5 \quad (2)$$

$$\alpha_{MD} + \alpha_{TD} \leq 10 \quad (3)$$

$$F_B \geq 8 \quad (4)$$

wherein R stands for retardation (nm), H stands for film haze (%), $\alpha_{MD}$ and $\alpha_{TD}$ respectively stand for shrinkage of the film in the longitudinal (machine) direction and in the direction perpendicular to said direction and $F_B$ stands for the strength at break point (kg/mm$^2$) in the longitudinal direction. The laminating material of the present invention does not generate interference fringes by polarized light, is excellent in transparency, heat resistance and strength and, therefore, suitable for heat ray reflection safety glass.

4 Claims, No Drawings

LAMINATING MATERIAL FOR SAFETY GLASS

FIELD OF THE INVENTION

This invention relates to a laminating material for safety glass for automobile windows (including wind shields) and the like having excellent heat ray reflection property, transparency, heat resistance and strength and being free from occurrence of interference fringe due to polarization of light.

BACKGROUND OF THE INVENTION

For automobile windows, usually safety glass consisting of glass plates laminated together with a polybutyral film is used in order to prevent scattering of shattered glass when window glasses (windshields) are broken. However, polybutyral is inferior in heat resistance and, therefore, cannot be laminated with a heat ray reflection layer or layers comprising a metal or a metallic compound and thus it is difficult to provide safety glass with heat-ray-reflection property.

Although various resins have been studied in search of better replacements of polybutyral, no material satisfactory in transparency, heat resistance, strength and non-occurrence of interference fringe due to polarization of light has not yet been developed.

We conducted an extensive study in consideration of the above-described problems and found a laminating material for safety glass having excellent characteristics.

SUMMARY OF THE INVENTION

The gist of the present invention resides in a laminating material for safety glass comprising a substrate of a polyester film satisfying the following conditions (1) to (4), on at least one side of which a heat ray reflection layer consisting of a metal and/or a metallic compound is laminated:

$$R \geq 8000 \quad (1)$$

$$H \leq 5 \quad (2)$$

$$\alpha_{MD} + \alpha_{TD} \geq 10 \quad (3)$$

$$F_b \geq 8 \quad (4)$$

wherein R stands for retardation (nm), H stands for film haze (%), $\alpha_{MD}$ and $\alpha_{TD}$ respectively stand for shrinkages of the film in the longitudinal (machine) direction and the direction perpendicular to said direction after the film is subjected to heat treatment at 150° C. for 30 minutes and $F_B$ stands for the strength at break point (kg/mm$^2$) in the longitudinal direction.

DETAILED DISCLOSURE OF THE INVENTION,

In the present invention, the word "polyester" means a polyester made from terephthalic acid and ethylene glycol, which may contain a third component. As a dicarboxylic acid component, one or more of isophthalic acid, phthalic acid, 2,6-naphthalenedicarboxylic acid, terephthalic acid, adipic acid, sebacic acid, oxycarboxylic acid, etc. can be used. As glycols, one or more of ethylene glycol, propylene glycol, butanediol, 1,4-cyclohexanedimethanol, neopentyl glycol, etc. can be used. At any rate, the polyester used in the present invention should preferably be such that more than 80% of the repeating units comprise ethylene terephthalate.

To the above polyester, up to 30% of the total weight of polycarbonate, polyolefine, polyamide, etc. can be incorporated in the polyester insofar as the object of the present invention is not impaired. Also incorporation of polyalkylene glycol or the like is preferable for the purpose of enhancing adherence when the film is coated by vapor deposition.

The above-described polyester may contain an additive or additives such as stabilizer, colorant, anti-oxidative, defoamer, organic lubricant, etc. Usually, fine organic particles and/or inert inorganic particles are incorporated in order to provide the resulting film with slipperiness.

Such particles include external inert particles such as kaolin, clay, calcium carbonate, silicon oxide, calcium terephthalate, aluminum oxide, titanium oxide, calcium phosphate, lithium fluoride, carbon black, high-melting organic compounds which are insoluble in the polyester when it is melted and made into film, internal particles which are formed within the polymer from metal oxide catalysts used for synthesis of the cross-linked polymer and the polyester (alkali metal compounds, alkaline earth metal compounds, etc. for instance).

The average particle size of the particles to be incorporated in the film is usually in the range of 0.01–3.5 μm. In order to provide the polyester film used in the present invention with a desirable film haze, the particles to be incorporated in the film should have a refractive index close to that of polyethylene terephthalate and be of the nature that does not easily form voids therearound when the film is stretched. One of examples of such particles is particles of amorphous silica but they are not limited thereto.

The polyester film used in the present invention should preferably have an intrinsic viscosity of not less than 0.50, more preferably not less than 0.60.

The polyester film used in the present invention should have a film haze of not more than 5%, preferably not more than 3% and more preferably not more than 2%. Films having a film haze in excess of 5% are not desirable because they may impair the transparency of the safety glass.

The polyester film used in the present invention should have a retardation of not less than 8000 nm, preferably not less than 9000 nm and more preferably not less than 10000 nm. The term "retardation" used in the present invention is a value defined by the following formula:

Retardation = Thickness (nm) × Birefringence

Films having a retardation of less than 8000 nm are undesirable since they may cause interference fringes by polarization of light.

As is apparent from the above formula, retardation depends on the birefringence of the film and, therefore, films of greater birefringence are preferred. Specifically, films having a birefringence of not less than 0.07 are preferred, those of not less than 0.09 are more preferred and those of not less than 0.1 are most preferred. Films having a birefringence less than 0.070 are not practical since thicker films must be used in order to attain desired retardations.

In order to obtain films having such birefringence, usually forcible stretching in one direction is employed. The laminating material for safety glass of the present invention is used for large glass plates and, therefore, the polyester film therefor should be one having been transversely stretched in one direction or forcibly stretched.

The polyester film used in the present invention should have a thickness deviation (unevenness) is preferably not greater than 5%, more preferably not greater than 4% and most preferably not greater than 3%. If a film having a thickness deviation in excess of 5% is used for safety glass, the resulting glass plates will have poor appearance because of optical strain.

The polyester film used in the present invention should satisfy the following conditions with respect to thermal shrinkage. That is, the sum of the longitudinal and transversal shrinkage when the film undergoes a heat treatment at 50° C. for 30 min. ($\alpha_{MD} + \alpha_{TD}$) should preferably be not more than 10%, more preferably not more than 7% and most preferably not more than 2%. The present invention includes process steps of forming a heat reflection layer comprising a metal or a metal compound on the film surface by means of sputtering, etc. and bringing the film into contact with glass plates, wherein the polyester film is exposed to a temperature of 100°–150° C.. If a film, of which ($\alpha_{MD} + \alpha_{TD}$) is in excess of 10%, is used, the film suffers impaired flatness.

Further, the longitudinal and transversal schrinkage of the polyester film used in the present invention after it undergoes a heat treatment at 150° C. for 30 min ($\alpha_{MD}$ and $\alpha_{TD}$) respectively should preferably be not more than 5%, preferably not more than 4% and most preferably not more than 3%. A polyester film, of which either of $\alpha_{MD}$ and $\alpha_{TD}$ is in excess of 5%, will suffer impaired surface flatness when it undergoes thermal hysteresis during sputtering, etc.

The polyester film used in the present invention should have a longitudinal strength at break point $F_B$ of not less than 8 kg/mm$^2$, preferably not less than 9 kg/mm and most preferably not less than 9.5 kg/mm. The polyester film used in the present invention is usually forcibly stretched transversely and, therefore, is inferior in the longitudinal strength. The polyester film is susceptible to longitudinal splitting when it is processed for production of safety glass if the longitudinal strength at break point thereof is less than 8 kg/mm$^2$, which will invite reduction in productivity.

The process for preparation of the polyester film to be used for this invention will be described in detail.

A substantially unoriented polyester film is longitudinally stretched by a factor of 1.0–1.25, preferably 1.0–1.2 and more preferably 1.0–1.1. With a stretching ratio in excess of 1.25, a film having desirable retardation value cannot be obtained. The longitudinally stretched film is then usually stretched transversely by a factor of 3.5–5.0 at 70°–110° C. A preferred transversal stretching ratio is 3.7–4.7 and more preferably 3.8–4.5. With a transversal stretching ratio of less than 3.5, thickness deviation of the film increases. With a transversal stretching ratio in excess of 5.0, film haze increases. The thus obtained stretched film is usually heat-treated at a temperature of 180°–250° C.

The film can be tentered or transversally and/or longitudinally relaxed in the highest temperature zone of the tenter (heat treatment step) or in the cooling zone at the exit of the tenter (heat treatment step).

The thus treated film can be further provided with a coating layer or layers on one side or both sides in order to provide the film with abrasion resistance, adhesiveness, slipperiness, antistatic property, etc.

The polyester film used in the present invention should have a thickness of 25–500 μm, preferably 38–200 μm.

The polyester film is laminated with a metal or a metal compound layer or layers on one side or both sides for the purpose of heat ray reflection.

For the heat ray reflection layer for the laminating material, a metal such as gold, silver, copper, aluminum, nickel or chromium, an alloy or a mixture thereof and a metal compound such as tin oxide, indium oxide, titanium oxide, tantalum oxide, tungsten oxide, zirconium oxide, zinc oxide, zinc sulfide, a mixture thereof can be used.

Of the above listed metals, gold, silver, copper, aluminum and an alloy thereof are preferred. The thickness of the metal layer should be 50–300 Å and preferably 70–150 Å in consideration of both heat reflection and transparency.

Of the above listed metal compounds, metal oxides such as indium oxide, tin oxide, titanium oxide, tantalum oxide and tungsten oxide are preferred. The thickness of thereof should preferably be 100–500 Å, more preferably 150–400 Å.

The heat ray reflection layer of a metal and/or a metal compound can be laminated to the polyester substrate by means of a vacuum deposition method such as sputtering, vacuum vapor deposition, ion plating, plasma chemical vapor deposition, etc.

The laminating material of the present invention (A) can be formed into a safety glass plates provided with heat ray reflection property by laminating adhesive layers (B) on the both sides thereof and sandwiching it between two glass plates (C) in the order of C/B/A/B/C.

The adhesive for the adhesive layer (B) can be selected from among vinyl resins, polyester resins and water-soluble resins, may contain various additives (plasticizer, UV-absorber, adhesive, etc.) and should preferably have impact strength property. Usually polyvinylbutyral and ethylene-vinyl acetate copolymer, which have excellent impact strength, transparency or UV resistance, are used.

The thickness of the adhesive layer (B) should preferably be 10–2000 μm, more preferably 150–1000 μm from the viewpoint of impact strength, transparency and flatness in the laminating process.

The thickness of the glass plate (C) should preferably be in the range of 1–6 mm, more preferably 1–4 mm. The glass plate can be annealed. Thermally tempered or chemically tempered glass plates can be used.

SPECIFIC DESCRIPTION OF THE INVENTION

The invention will now be illustrated by way of working examples. However, the invention is not limited to these working modes only but limited by the claims.

The methods of evaluating quality of films are as follows:

(1) Intrinsic viscosity ($\eta$)

One gram (1 g) of a polymer is dissolved in 100 ml of a phenol/chloroethane 50:50 weight ratio mixture and viscosity was measured at 30° C.

(2) Birefringence ($\Delta n$)

Using an Abbe refractometer manufactured by Atago Kogaku Kogyo Kabushiki Kaisha (Atago Optical Co., Ltd.), the maximum refraction index in the film plane n? and the refraction index in the direction perpendicular to the former $n_\beta$ were measured with the Na-D line at 23° C. and the birefringence was defined as:

Birefringence $(n) = n_{65} - n_\beta$ (3) Retardation
Retardation was determined as:

$R = \Delta n \times d$ wherein
R: retardation,
d: film thickness (nm) and
Δn: birefringence (4) Film haze
Film haze was measured using a NDH-20D hazemeter manufactured by Nippon Denshoku Kogyo Kabushiki Kaisha.

(5) Thermal shrinkage (%)
Thermal shrinkage was determined from the difference in length of the sample before and after the heat-treatment 150° C. for 30 min. Thermal shrinkage was defined as:

Thermal shrinkage (%) =

[(length before heat treatment (mm)) −

(length after heat treatment (mm))]/

(length before heat treatment) × 100

(6) Thickness deviation of film
Using a continuous film thickness tester manufactured by Anritsu Denki Kabushiki Kaisha (equipped with an electronic micrometer), thickness was measured longitudinally and transversely over a length of 3 meters.

Thickness deviation =

[(maximum thickness) − (minimum thickness)]/

(mean thickness) × 100%

(7) Strength at break point ($F_B$)
A film sample measuring 50 mm in length and 15 mm in width was pulled at the rate of 50 mm/min in an atmosphere adjusted to 50% RH and 23° C. by means of an Intesco Model 2001 tensile tester manufactured by Kabushiki Kaisha Intesco. The strength at the time of rupture was defined as $F_B$.

(8) Applicability as laminating material for safety glass
A heat-ray-reflection layer was formed on one side of a polyester film by sputtering, the resulting laminating material (A) was coated with adhesive layers (B) on both sides and sandwiched between two glass plates (C) in the order of C/B/A/B/C to obtain a plate of safety glass. The resulting safety glass was evaluated in accordance with the following criteria for workability.
(a) Workability ◯ No rupture of film during the above-described operation. Good flatness retained after sputtering. Workability good.
X: Rupture of film occurs and productivity low.
◯: (b) Visual observation
◯: Beautiful finish with excellent transparency. No interference fringes when observed through polarized sun glass.
Δ: No interference fringes when observed through polarized sun glass although transparency and finish are not entirely satisfactory.
X: Transparency and finish are not satisfactory. Interference fringes observed. Not usable.

WORKING EXAMPLE

Polyethylene terephthalate containing 0.006 wt % of amorphous silica particles having an average particle size of 1.5 microns was dried, extruded at 285° C., cooled to obtain an amorphous sheet having an intrinsic viscosity of 0.65.

The obtained sheet was conveyed to a tenter, wherein the sheet was transversely stretched by a factor of 4.1 and then was heat-set at 215° C. Thus a film having a thickness of 100 μm was obtained.

The film was coated with an alloy of gold and silver (gold content 40 wt %) at a thickness of 100 A by sputtering and further the metal-coated film was coated with titanium oxide by sputtering to a thickness of 300 A. Thus a laminating material (A) was obtained.

The obtained laminating material (A) was laminated with polyvinylbutyral layers (B) and transparent glass plates (C) having a thickness of 2 mm in the order of C/B/A/B/C and thus a safety glass plate was prepared by heating and pressing

COMPARATIVE EXAMPLE

The amorphous sheet obtained in the example was longitudinally stretched by a factor of 3.6 at 85° C., transversely by a factor of 4.0 at 120° C. and finally heat-set at 230° C. Thus a film having a thickness of 100 μm.

The obtained film was worked in the same manner as in the example by sputtering and formed into a safety glass piece.

The results of the example and the comparative example were summarized in Table 1.

TABLE 1

|  | Biref. Δn | Retardation R (nm) | Haze H (%) | Thermal Shrinkage | | | $F_B$ (kg/mm²) | Applicability | |
| --- | --- | --- | --- | --- | --- | --- | --- | --- | --- |
|  |  |  |  | $a_{MD}$ | $a_{TD}$ | $a_{MD} + a_{TD}$ |  | Workability | Visual Eval. |
| Example | 0.108 | 10800 | 1.3 | 0.4 | 0.5 | 0.9 | 10.0 | ◯ | ◯ |
| Com. Example | 0.022 | 2200 | 1.5 | 1.0 | 0.1 | 1.1 | 19.5 | ◯ | X |

The product of the comparative example is good in workability and transparency but interference fringe was recognized when observed through polarized sun glasses. In contrast, the product of the working example was a safety glass plate with beautiful finish having heat ray reflection effect and developing no interference fringes.

The laminating material of the present invention does not generate interference fringes by polarized light, is excellent in transparency, heat resistance and strength and, therefore, suitable for heat ray reflection safety glass. Thus the invention is industrially valuable.

What we claim is:

1. A laminating material for safety glass comprising a substrate of a polyester film satisfying the following conditions (1) to (4), on one side of which a heat ray shielding layer consisting of a metal and/or a metallic compound:

$$R \geq 8000 \quad (1)$$

$$H \leq 5 \quad (2)$$

$$\alpha_{MD} + \alpha_{TD} \leq 10 \quad (3)$$

$$F_B \geq 8 \quad (4)$$

wherein R stands for retardation (nm), H stands for film haze (%), $\alpha_{MD}$ and $\alpha_{TD}$ respectively stand for shrinkage of the film in the longitudinal (machine) direction and in the direction perpendicular to said direction and $F_B$ stands for the strength at break point (kg/mm$^2$) in the longitudinal direction.

2. The laminating material for safety glass as claimed in claim 1, wherein $$R \geq 900 \quad (1)$$

$$H \leq 5 \quad (2)$$

$$\alpha_{MD} + \alpha_{TD} \leq 7\% \quad (3)$$

$$F_B \geq 9 \quad (4)$$

3. The laminating material for safety glass as claimed in claim 1, wherein $$R \geq 10000 \quad (1)$$

$$H \leq 5 \quad (2)$$

$$\alpha_{MD} + \alpha_{TD} \leq 2\% \quad (3)$$

$$F_B \geq 9.5 \quad (4)$$

4. The laminating material for safety glass as claimed in claim 1, wherein the polyester film comprises, polyethylene terephthalate.

* * * * *